(12) United States Patent
Robert

(10) Patent No.: US 10,348,130 B2
(45) Date of Patent: Jul. 9, 2019

(54) POWER HARVESTING FOR RFID/NFC-APPLICATIONS

(71) Applicant: NXP B.V., Eindhoven (NL)

(72) Inventor: Harald Helfried Robert, Gratkorn (AT)

(73) Assignee: NXP B.V., Eindhoven (NL)

( * ) Notice: Subject to any disclaimer, the term of this patent is extended or adjusted under 35 U.S.C. 154(b) by 363 days.

(21) Appl. No.: 15/221,363

(22) Filed: Jul. 27, 2016

(65) Prior Publication Data

US 2018/0034319 A1    Feb. 1, 2018

(51) Int. Cl.
| | | |
|---|---|---|
| G05F 5/00 | (2006.01) |
| H01Q 1/22 | (2006.01) |
| H02J 50/10 | (2016.01) |
| H02M 7/06 | (2006.01) |
| H04B 5/00 | (2006.01) |
| H02J 7/02 | (2016.01) |

(52) U.S. Cl.
CPC .............. *H02J 50/10* (2016.02); *G05F 5/00* (2013.01); *H01Q 1/2208* (2013.01); *H02J 7/025* (2013.01); *H02M 7/06* (2013.01); *H04B 5/0037* (2013.01); *H04B 5/0062* (2013.01)

(58) Field of Classification Search
None
See application file for complete search history.

(56) References Cited

U.S. PATENT DOCUMENTS

| | | | |
|---|---|---|---|
| 7,084,605 B2 | 8/2006 | Mickle et al. | |
| 2009/0243397 A1* | 10/2009 | Cook | H02J 5/005 307/104 |
| 2010/0039234 A1 | 2/2010 | Soliven et al. | |
| 2011/0217927 A1* | 9/2011 | Ben-Shalom | H04B 5/0025 455/41.1 |
| 2011/0221569 A1 | 9/2011 | Hamel et al. | |
| 2012/0293009 A1* | 11/2012 | Kim | H02H 7/1252 307/104 |
| 2015/0178526 A1 | 6/2015 | Roh et al. | |
| 2016/0043658 A1* | 2/2016 | Lopez | H02M 7/217 363/89 |

FOREIGN PATENT DOCUMENTS

CA    2 4814 42 A1    10/2003

OTHER PUBLICATIONS

Tseng, et al., "Introduction to the Alliance for Wireless Power Loosly-Coupled Wireless Power Transfer System Specification Version 1.0", IEEE Wireless Power Transfer Conference, 2013, pp. 1-6.

* cited by examiner

Primary Examiner — Jared Fureman
Assistant Examiner — Aqeel H Bukhari

(57) ABSTRACT

Disclosed is a circuit apparatus including an input section configured to receive an electromagnetic (EM) transmission, a voltage divider section configured to divide the EM transmission into a plurality of voltage levels, a rectifier portion configured to rectify AC power received in the EM transmission, and a load configured to receive DC power from the rectifier portion, wherein one level of the voltage divider section is configured to supply power to a radio frequency identification integrated circuit (RFID-IC).

20 Claims, 11 Drawing Sheets

POWER HARVESTING FOR RFID/NFC-APPLICATIONS

TECHNICAL FIELD

Various exemplary embodiments disclosed herein relate to power harvesting circuitry in combination with RFID and NFC applications.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of embodiments adequate to allow those of ordinary skill in the art to make and use the inventive concepts will follow in later sections.

Various exemplary embodiments are related to a circuit apparatus including an input section configured to receive an electromagnetic (EM) transmission, a voltage divider section configured to divide the EM transmission into a plurality of voltage levels, a rectifier portion configured to rectify AC power received in the EM transmission, and a load configured to receive DC power from the rectifier portion, wherein one voltage level of the voltage divider section is configured to supply power to a radio frequency identification integrated circuit (RFID-IC).

The RFID-IC may include a data port configured to communicate with electrical components on the circuit apparatus.

The RFID-IC may be in parallel with a capacitor of the voltage divider portion.

The circuit apparatus may include at least one capacitor configured to store charge to be rectified. The at least one capacitor may be arranged asymmetrically.

The input section may include an antenna with multiple taps. The voltage divider may include a plurality of capacitors. The voltage divider may include a plurality of resistors.

Various exemplary embodiments are also related to a power harvesting apparatus including an RFID circuit, including an antenna configured to receive an electromagnetic (EM) transmission, the antenna including a plurality of taps configured to vary the voltage received from the EM transmission, at least one capacitor configured to store charge received in the EM transmission, and a rectifier portion configured to rectify power received in the EM transmission and provide the rectified power to a load, wherein one voltage level of the antenna taps is configured to supply power to a radio frequency identification integrated circuit (RFID-IC).

The at least one capacitor may be arranged asymmetrically. A plurality of capacitors may be arranged symmetrically.

The rectifier portion may be configured to produce two voltages across an output load. The two voltages may be a positive voltage and a negative voltage.

Various exemplary embodiments are also related to a power harvesting circuit including an antenna configured to receive an electromagnetic (EM) transmission, a low power circuit configured to receive a low voltage from the EM transmission, a voltage divider circuit having a plurality nodes configured to produce a plurality of voltages across different sets of the plurality of nodes, a rectification circuit configured to receive a high AC voltage from the EM transmission and rectify the high AC voltage to a DC voltage, and a high power circuit configured to receive the high voltage and power a load using the high voltage.

The low power circuit may be a radio-frequency identification integrated circuit (RFID-IC).

The power harvesting circuit may include a load delivery circuit configured to deliver a stepped down voltage to a load.

The voltage divider circuit may include a plurality of capacitors. The low power circuit may be an RFID integrated circuit.

The power harvesting circuit may include a galvanic connection between the low power circuit and the high power circuit. The voltage divider circuit may include an antenna having a center tap.

BRIEF DESCRIPTION OF THE DRAWINGS

Additional objects and features of the invention will be more readily apparent from the following detailed description and appended claims when taken in conjunction with the drawings. Although several embodiments are illustrated and described, like reference numerals identify like parts in each of the figures, in which:

DETAILED DESCRIPTION

Figure 1:
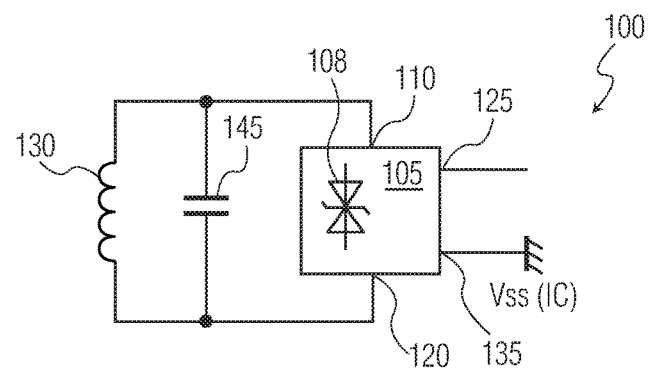
FIG. 1 illustrates an RFID apparatus in accordance with embodiments described herein.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated. Descriptors such as "first," "second," "third," etc., are not meant to limit the order of elements discussed, are used to distinguish one element from the next, and are generally interchangeable.

Embodiments described herein include systems to increase output power from apparatuses that include Radio Frequency Identification Integrated Circuits (RFID-ICs), and apparatuses that receive power without interfering or destroying the RF communication or the RFID-IC itself. The RFID-IC may be used for Near Field Communication (NFC).

Passive RFID tags obtain their operating power by receiving energy from an electromagnetic field of a reader's communication signal. The limited resources of a passive tag require it to both receive its energy and communicate with a reader within a specified frequency band. RFID tags are inductive capacitive (LC) devices that may transmit signals at a resonance frequency.

Passive RFID tags and surrounding electronics may form an apparatus that obtains its power from the communication signal through inductive coupling and far field harvesting. Inductive coupling uses a magnetic field generated by a communication signal to induce a current in its coupling element, such as a coiled antenna and a capacitor. An antenna may receive an electromagnetic transmission from a transmitter. The current induced in the coupling element charges the on-apparatus capacitor(s) that provides an operating voltage, and power, for the apparatus. Inductive coupling works in the near-field of the communication signal.

Related art power harvesting circuits have outputs in the range of 15-20 mW, representing an efficiency of 4-5%. Embodiments described herein include circuitry that can yield up to 400 mW on a 315 mm$^2$ or similar size integrated circuit, which can yield an efficiency of 20-32%. An amount of output power may be influenced by available antenna-coil area and RF-field-strength.

FIG. 1 illustrates a RFID apparatus 100 in accordance with embodiments described herein. The RFID apparatus 100 includes an RFID-IC 105 that is connected via the two IC-nodes 110 and 120. The RFID-IC 105 may be implemented on a tag or the like. The RFID-IC 105 is connected to an antenna-coil 130 to receive near-field communication from external sources (not illustrated). The RFID-IC 105 may have a certain capacitance (C_IC) on silicon which may create a resonance circuit with the inductance of the antenna-coil 130. If C_IC is too low, an additional capacitor 145 may be used to make the RFID-IC 105 work as a resonance circuit at a predetermined frequency.

The RFID-IC 105 is a passive device and uses a small amount of power (e.g. 0.025 mW) to operate. To prevent distortion or damage of the RFID-IC 105 by exposing a label or tag on which an RFID-IC 105 may be mounted to a very strong RF-field, the RFID-IC 105 has a limiter circuit 108 integrated on the chip, which clips the peak-to-peak RF voltage across the RFID-IC 105 antenna nodes to be under a highest allowed voltage level. This limiter circuit 108 may designed to operate in a range from 6.0 to 6.5 volts, but limiter circuits to be used with embodiments described herein are not limited thereto.

RFID-IC 105 may include a connection 125 to connect the RFID-IC 105 to external components such as via a data-bus, a switch (e.g. open drain of a MOSFET in the RFID-IC 105), or an auxiliary voltage, etc. RFID-IC 105 is grounded at $V_{SS}$ node 135, which may be a common bus for other connected circuit components.

Combining lower voltage circuits such as RFID-IC 105 with higher voltage circuits for harvesting may be embodied in various circuits and apparatuses as described herein. Low voltages may be circuits generally using below 3.5V and may be in the range of as 2.0-2.5V. High voltage circuits may be above about 5V and up to at least 15V and may be 7V or 12V.

Embodiments may include a capacitive voltage-divider, a single antenna coil, low cost circuits and components, and other methods will be described for universal usage, and a power range of 50 to 400 mW. The output power can be used to drive passive and active devices. Applications where RFID with power harvesting may be used include battery recharging via NFC/smart phone, "battery-less devices" that include high level electronics on board, such as a bike-computer or price-display in a store, where power is delivered by a mobile or smart-phone during operation. Games with interactive components, such as tokens or figurines that have status changes or use LEDs may make use of the harvested power. Appliances like coffee makers could be implemented to get a "personal coffee" out of a brewer, and more.

Figure 2:
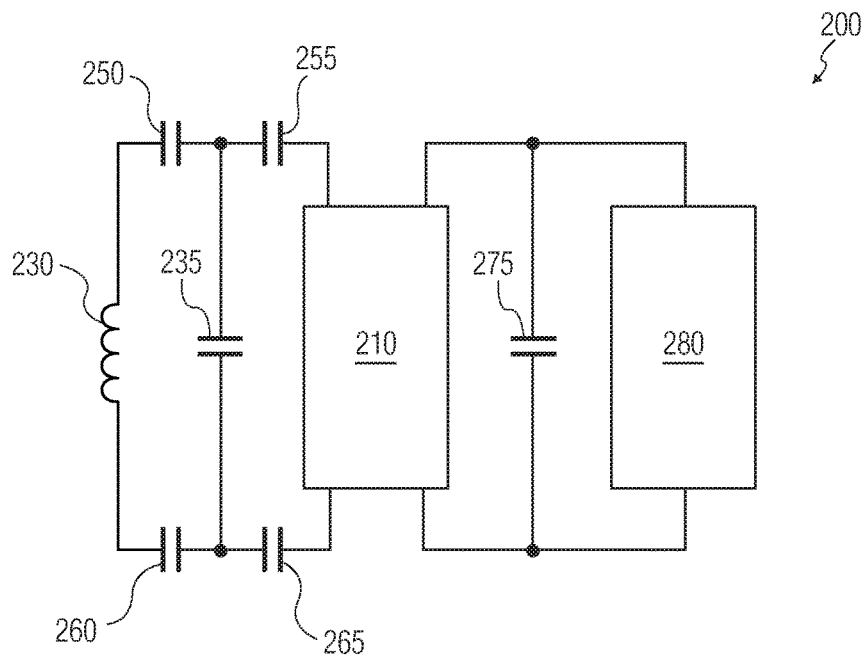
FIG. 2 illustrates an RF-power harvesting apparatus in accordance with embodiments described herein.

FIG. 2 illustrates a power harvesting apparatus 200 in accordance with embodiments described herein. Additional electronic components (e.g. voltage converter, voltage-regulator, micro-controllers, sensors, LEDs, battery-charger, etc.) that can be used on a label, tag, or other RFID/NFC device require more power than used by the RFID-IC 105, and may make use of the power harvesting apparatus 200. The power harvesting apparatus 200 includes a rectification circuit 210 to convert AC to DC to power a load(s) 280. The RF-input-voltage of the rectification circuit 210 in the power harvesting apparatus 200 may be high to compensate internal losses of the receiving antenna-coil 230 and the voltage-drop(s) across the rectification circuit 210. In idle-mode (without a load after rectification) the output-voltage across an output capacitor 275 could climb very high (e.g. >30 V).

For the power harvesting apparatus, several rectification technologies may be used. One challenge to ordinary circuits is a high operation frequency. Mains frequencies are in the range of 50 or 60 Hz. For RFID/NFC circuits, a frequency of 13.56 MHz is specified. Resonance adjustment of the power harvesting apparatus 200 could be managed in several ways such as a parallel-capacitor method using a parallel capacitor 235. Output capacitor 275 is a storage capacitor and may be used to keep the rectified voltage above a lower voltage limit of electronic circuitry during RF reception.

There is also a series-capacitor method that may use capacitors 250, 255, 260, and/or 265 in combination with the parallel capacitor 235 in different combinations. This method could be split into a symmetrical method using, e.g. capacitors 255 and 265 or an asymmetrical method using, e.g., capacitors 255 or 265 only).

The parallel-capacitor method and the series-capacitor method could be combined. In that case the series-capacitor(s) 250 and 260 could be placed before the parallel-capacitor 235. Capacitors 250 and 260 could be used for symmetrical operation. Capacitor 250 or 260 for asymmetrical. In implementation, all series capacitors 250, 255, 260, and 265 could be used in combination with parallel capacitor 235.

The RFID apparatus 100 and power harvesting apparatus 200 may operate in a configuration with two separate antenna-coils 130 and 230. The standalone RFID apparatus 100 and power harvesting apparatus may be connected at the VSS 135 of the RFID apparatus 100 to a GND line (not illustrated) of the electronic load(s) 280. In such a case there is no cross-current between nodes VSS 135 and the GND of the load(s) 280 when they are not positioned near the antenna-coils 130 and 230. For data exchange or communication between RFID apparatus 100 and power harvesting apparatus 200, an additional communication line is needed. This may create residual current flow between the RFID apparatus 100 and power harvesting apparatus 200, depending on what else is connected.

This residual current may reduce efficiency and performance because the current does not contribute to power harvesting. A residual current might work at one half-wave (e.g. the positive half-wave) but it could work poorly or not work at all at the other half-wave (e.g. negative half-wave). The residual current could interfere with RFID communication as well.

Figure 3:
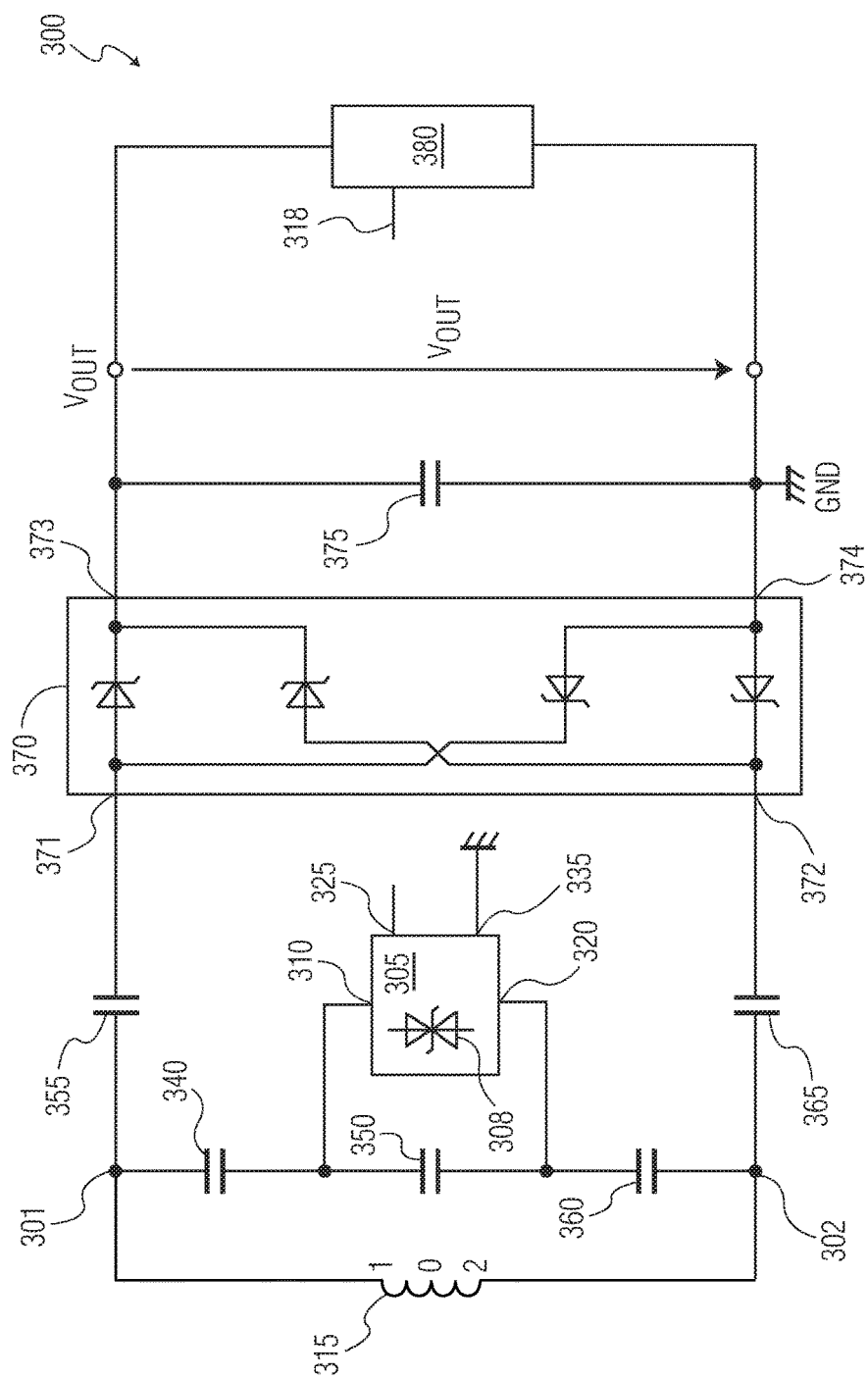
FIG. 3 illustrates a power harvesting apparatus including an RFID-IC, antenna coil, symmetrical capacitive RF-voltage divider, symmetrical series capacitors, and bridge rectification in accordance with embodiments described herein.

FIG. 3 illustrates a power harvesting apparatus 300 including an RFID-IC 305, antenna coil 315, symmetrical capacitive RF-voltage divider, symmetrical series capacitors, and bridge rectification in accordance with embodiments described herein. The power harvesting apparatus 300 may combine RFID with RF-power harvesting by having multiple connections between the two apparatuses. In embodiments described herein, by sharing one antenna-coil there can be multiple galvanic and electrical connections between an RFID apparatus 100 and a power harvesting apparatus 200.

FIG. 3 illustrates three series capacitors 340, 350, and 360, which separate the different voltage levels used for a RFID-IC 305 within the power harvesting apparatus 300, using a voltage divider. The capacitors 340 and 360 may reduce the high voltage received at nodes 301 and 302 for power harvesting, allowing RF to pass, which may be used for RFID-IC 305 powering and communication at lower voltage levels. As illustrated in FIG. 3, using a shared antenna coil 315, there is only one galvanic connection used to provide low power to the RFID-IC 305 higher power to an electronic load(s) 380 of the power harvesting apparatus 300.

The RFID-IC 305 may use on-chip electronics to convert AC power received via shared antenna coil 315 and capacitor 350 into small direct current (DC) voltages. The RFID-IC 305 has a node 325 to connect to a data bus or the like, which may connect to a node 318 of load(s) 380. Node 325 may have several uses such as a low power voltage output, an open-drain pin, or a bus with SCL (Serial CLock) and SDA (Serial DAta). In other embodiments, node 310 or 320 may act as a supply input for the RFID-IC 305 when a battery is used and RF is switched off. In these various instances the RFID-IC 305 uses a reference $V_{SS}$ (ground) node 335 that may be connected to other power harvesting apparatus 300 components. In general, the power harvesting apparatuses 300, and RFID-IC 305 may operate when no current flows across RFID-IC 305 node $V_{SS}$ 335, or if a little cross-current flows in or out of VSS node 335, or from elsewhere. Symmetrical configurations as discussed herein may be used for data communications between nodes 325 and 318.

Energy received through the shared antenna coil 315 may be stored in the capacitors 340, 350, 360, 355, and 365 as a DC voltage. The power harvesting apparatus 300 includes a rectification circuit 370 which may be, for example, a bridge rectifier also known as a full-wave rectifier that converts AC to DC. The rectification circuit 370 may include a plurality diodes, connected in a bridge configuration. Other diodes that may be used include Schottky diodes, fast silicon rectifiers having a short reverse recovery time characteristic, and small signal universal diodes. In the rectification circuit 370, inputs for RF-voltage are at nodes 371 and 372, and rectified output are at nodes 373 and 374. The rectified output at nodes 373 and 374 is smoothed into a DC output by the output capacitor 375. For power harvesting a full-wave-rectifier has excellent efficiency, though embodiments described herein are not limited to these types of rectifiers.

The chain of capacitors 340, 350, and 360 has multiple purposes. One purpose is a capacitive voltage divider. This divider reduces the high RF-voltage from the shared antenna coil 315 down to a lower RF-voltage across the IC-nodes 310 and 320. In a second purpose, an incoming RF-communication passes the capacitors 340 and 360 in a same ratio as input voltage is reduced. A third purpose, this chain of capacitors 340, 350, and 360 becomes a collective parallel capacitor, similar to parallel capacitor 235 illustrated in FIG. 2, which may be a resonant capacitor as later described in Equation 3 and elsewhere, to adjust a resonance frequency of a receive side of the power harvesting apparatus 300.

Figure 4A:
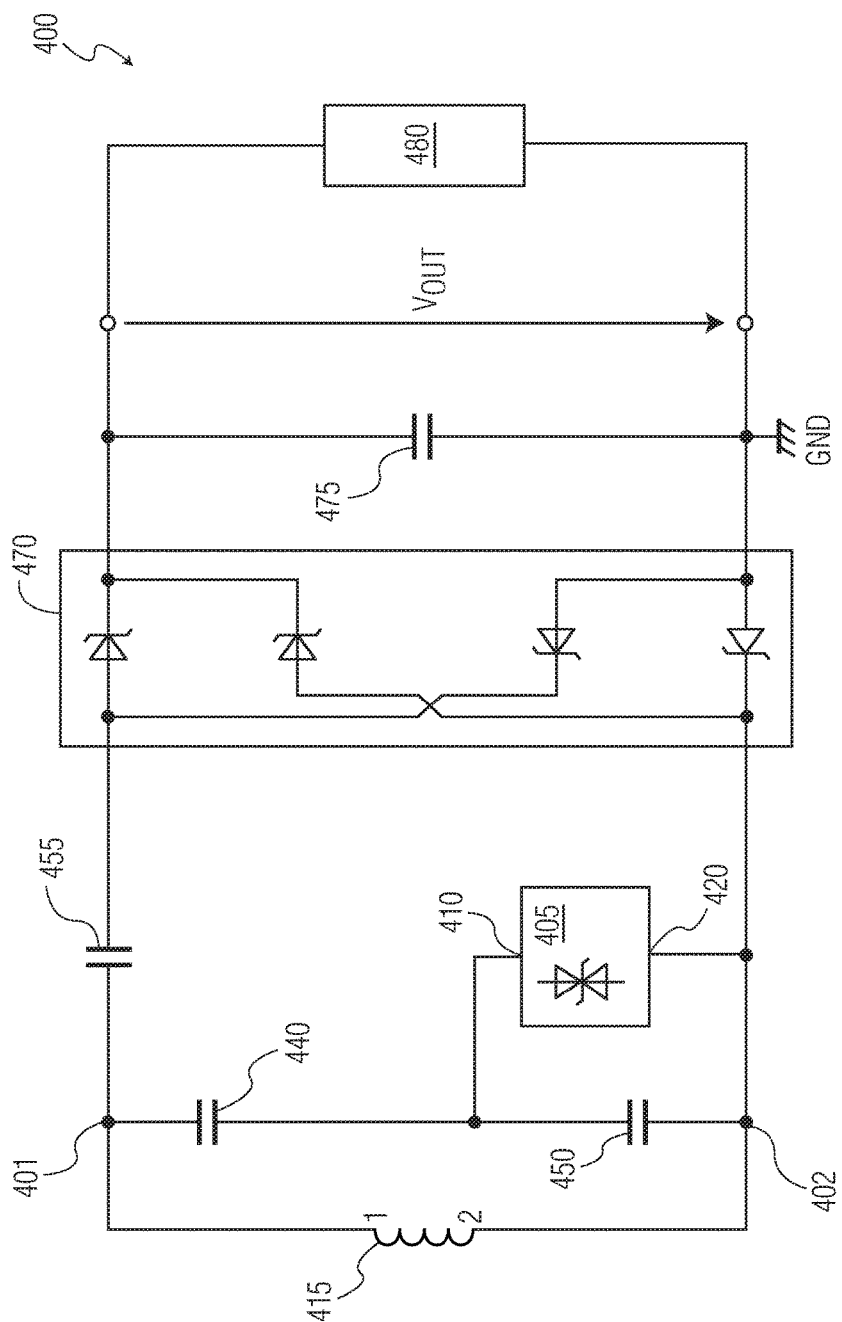
FIG. 4A illustrates another power harvesting apparatus including an RFID-IC, antenna coil, asymmetrical capacitive RF-voltage divider, a single asymmetrical series-capacitor, and bridge rectifier in accordance with embodiments described herein.

The series-capacitors 355 and 365 to the rectification circuit 370 may be arranged symmetrically, using both capacitor 355 and capacitor 365, or asymmetrical using either capacitor 355 or capacitor 365 (illustrated in FIG. 4A for example with capacitor 455). Capacitors 340, 350, and 360 may be used as a voltage divider as capacitors are relatively lossless when used in this capacity.

Once a carrier frequency is determined to communicate with the RFID-IC 305, various component values can be determined for the capacitors in the power harvesting apparatus 300.

For example, the combination circuit may be defined to work at a defined frequency (target of 13.56 MHz). The value of an effective resonance capacitor ($C_{eff}$) may be determined. Equation 1 may be derived for frequency calculation:

$$f = \frac{1}{2 \cdot \pi \cdot \sqrt{L \cdot (C_{eff} + k \cdot C_s)}} \qquad \text{Eq. 1}$$

Cs represents de-coupling low-ohm rectification circuit 370 and load(s) 380 circuitries and making a series resonance circuit therewith. Cs is not 100% in parallel to the antenna-coil, and therefore k is the reduction ratio.

To determine a value of $C_{eff}$, an antenna-inductance (L), frequency (f) and Cs are given, and k is estimated. By solving for $C_{eff}$, a value may be obtained.

$$C_{eff} = \frac{1}{L \cdot (2 \cdot \pi \cdot f)^2} - k \cdot C_s \qquad \text{Eq. 2}$$

Using the elements of the power harvesting apparatus 300, and taking C_IC to be the capacitance of the RFID-IC 305, C1 to be the capacitance of capacitor 350, C2 to be the capacitance of capacitor 340, and C3 to be the capacitance of capacitor 360, $C_{eff}$ can be further defined as:

$$C_{eff} = \frac{1}{\frac{1}{C_2} + \frac{1}{C_{IC} + C_1} + \frac{1}{C_3}} \qquad \text{Eq. 3}$$

The capacitance of the RFID-IC 305 in equation 3 may be given by data sheet. Various combinations of C1, C2 and C3 would fulfill the requirement of equation 3. Capacitor value relationships may be based on several factors, such as the voltage drops across the capacitors.

Assuming the output voltage across an output capacitor 375 (respectively node 373 to node 374 may be 7.4 $V_{DC}$). Next assume the voltage drop over the rectification circuit 370 (e.g. 2 Schottky diodes in series for each half-wave of the bridge-rectifier) is 2 times 0.3 V, which means the voltage across node 371 and node 372 is 8.0 $V_{RMS}$ at maximum. By assuming to have a sine wave-shape there is 22.6 volts peak-to-peak across the antenna-coil.

The behavior inside of the RFID-IC 305 from IC node 310 to Vss is different than from node 320 to $V_{SS}$. This difference may cause a delta-voltage of 0.4 V, for example. For an ordinary application capacitors 340 and 360 could have the same value. For TOP-power harvesting it is recommended to calculate the voltage drops across all three capacitors 340, 350, and 360 to get a highest possible efficiency, measured in a minimum of losses. A target is to have no current flowing out of or into the $V_{SS}$ node 335. In this condition a current flows through capacitor 340, capacitor 350 in parallel with C_IC, and capacitor 360, without any current at the $V_{SS}$ node 335.

The impedance of a capacitor is calculated by Equation 4:

$$X_C = \frac{1}{2 \cdot \pi \cdot f \cdot C} \qquad \text{Eq. 4}$$

Applied to the capacitive voltage-divider, for each capacitor the voltage across it could be calculated. The labeling of voltages in the following equations are in accordance to the power harvesting apparatus 300, for example.

$$V_{C_2} = V_{node\_301-302} \frac{C_{eff}}{C_2} \qquad \text{Eq. 5}$$

$$V_{C_{IC}//C_1} = V_{node\_301-302} \frac{C_{eff}}{C_{IC} + C_1} \qquad \text{Eq. 6}$$

$$V_{C_3} = V_{node\_301-302} \frac{C_{eff}}{C_3} \qquad \text{Eq. 7}$$

FIG. 4A illustrates another power harvesting apparatus 400 including an RFID-IC 405, antenna coil 415, asymmetrical capacitive RF-voltage divider, a single asymmetrical series-capacitor, and rectification circuitry 470 such as a bridge rectifier in accordance with embodiments described herein. FIG. 4A illustrates a reduction in the number of capacitors as compared to other embodiments. As illustrated in FIG. 4A, a reduction in capacitors may produce an asymmetrical behavior and a reduction an amount of power that is harvested, if desirable for a given output load. Because of a reduction of capacitors in this manner to produce an asymmetrical arrangement, cross currents in the power harvesting apparatus 400 may increase which may lead to signal interference between an RFID-IC 405 and a load(s) 480. In this embodiment, an RFID-IC 405 may not have a data connection with a load(s) 480, to avoid the cross currents. Output capacitor 475 is a capacitor and may be used to keep the rectified voltage above a lower voltage limit of electronic circuitry during RF reception.

As illustrated in FIG. 4A, an RFID-IC 405 is connected in parallel with capacitor 450, which becomes a voltage source for the RFID-IC 405. With capacitor 450 powering the RFID-IC 405, the voltage available to the load(s) 480 is decreased and may only be stored in capacitors 440 and 455, and rectified by rectification circuitry 470.

Figure 4B:
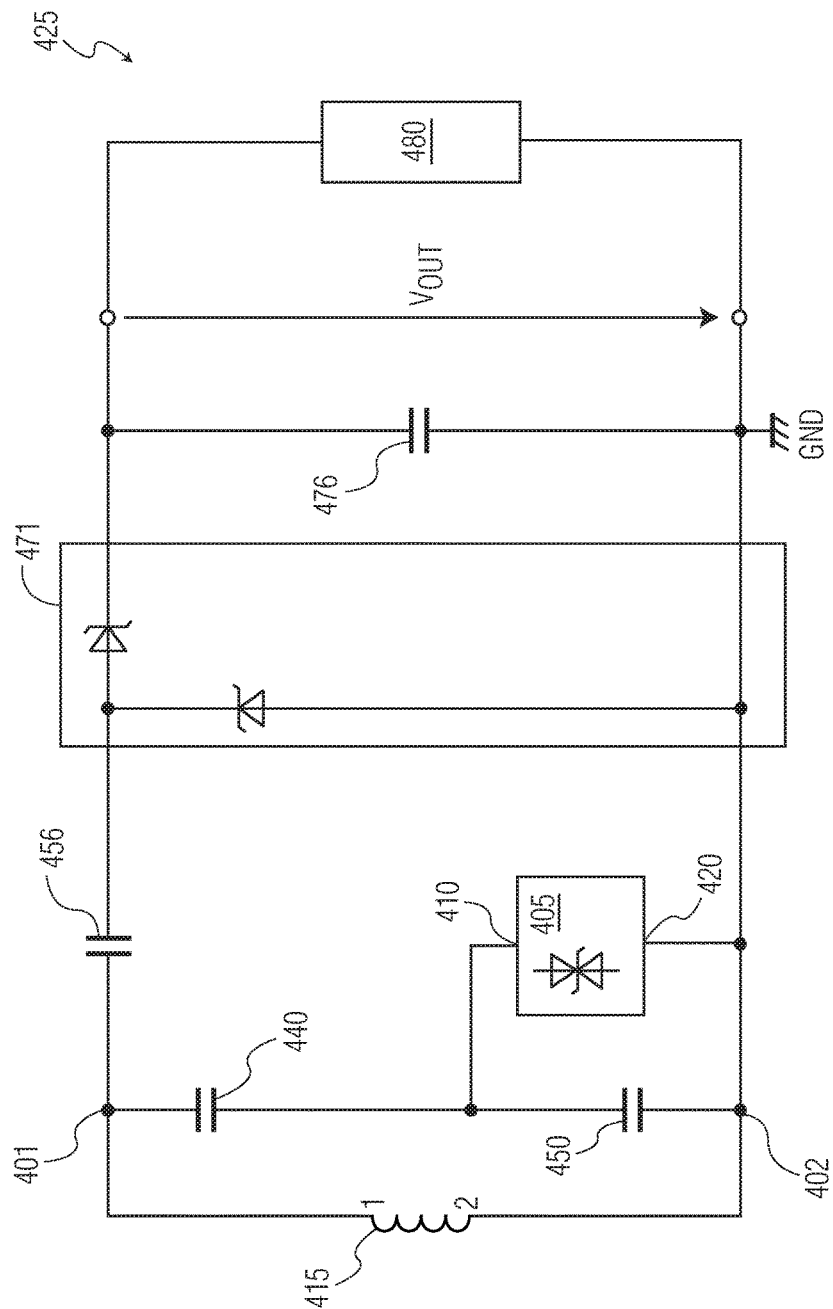
FIG. 4B illustrates another power harvesting apparatus including an RFID-IC, antenna coil, asymmetrical capacitive RF-voltage divider, an asymmetrical series-capacitor, and a half wave voltage doubling circuit in accordance with embodiments described herein.

FIG. 4B illustrates another power harvesting apparatus 425 including an RFID-IC 405, antenna coil 415, asymmetrical capacitive RF-voltage divider, an asymmetrical series-capacitor, and a half wave voltage doubling circuit 471 in accordance with embodiments described herein.

FIG. 4B differs from FIG. 4A in that the rectification circuit may be a half wave voltage doubling circuit 471. The use of this half wave doubling circuit 471 may change the series capacitance value of capacitor 456 and may change a value of capacitor 476 and Vout as well.

Figure 5A:
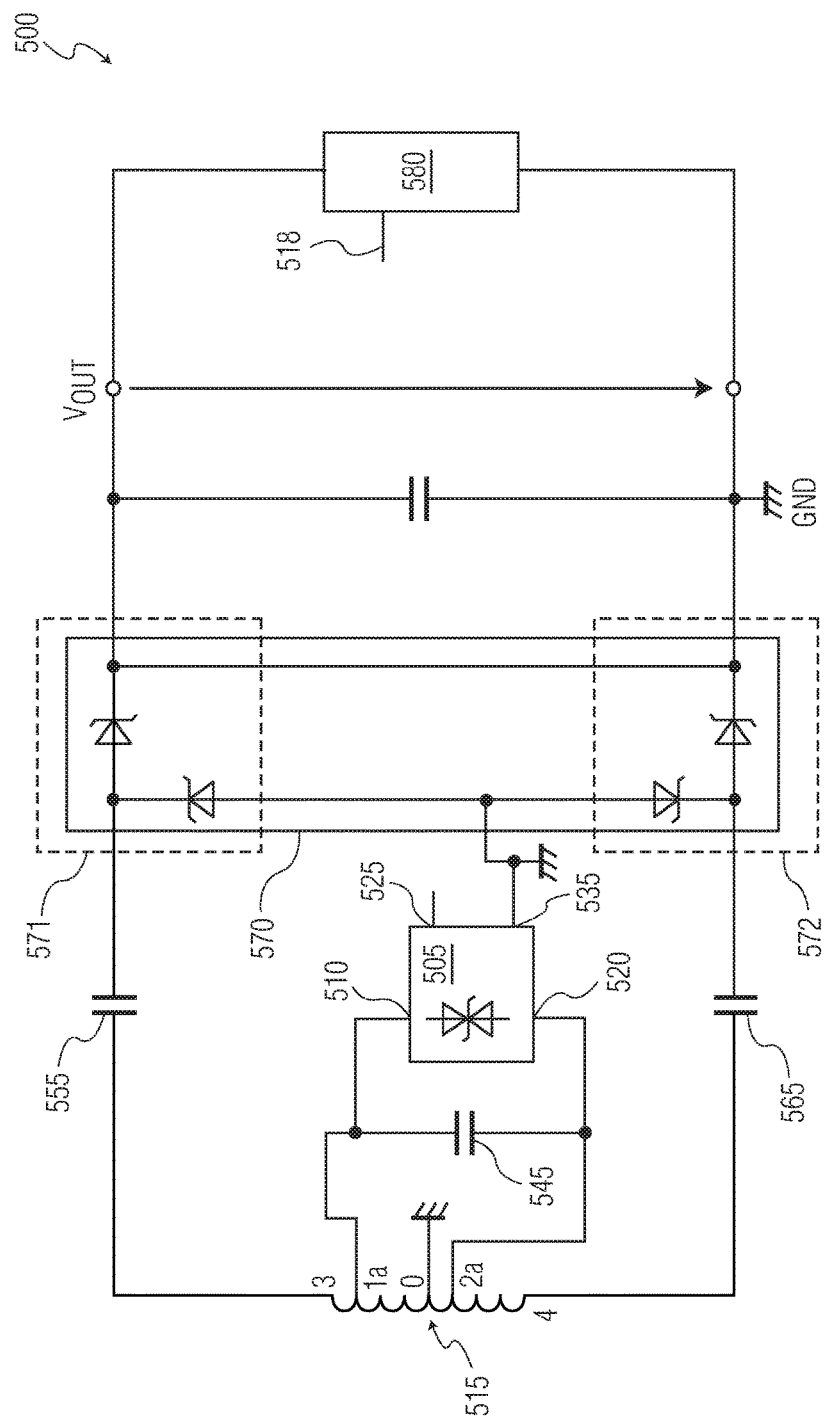
FIG. 5A illustrates yet another power harvesting apparatus including an RFID-IC, a multiple tap antenna coil, symmetrical series-capacitors, and two half wave voltage doubling circuits in parallel in accordance with embodiments described herein.

FIG. 5A illustrates yet another power harvesting apparatus 500 including an RFID-IC 505, a multiple tap antenna coil 515, symmetrical series-capacitors 555 and 565, and two half-wave voltage rectifier pairs 571 and 572 in parallel in accordance with embodiments described herein. Using the multiple tap antenna coil 515 allows different voltages to be used without a capacitive RF-voltage divider. The power harvesting apparatus 500 uses a single capacitor 545 in parallel, for fine tuning or resonance frequency adjustment, with the multiple tap antenna coil 515 and the RFID-IC 505.

As illustrated in FIG. 5A, the multiple tap antenna coil 515 has multiple taps 0, 1, 2, 3, and 4, from which various lengths of multiple tap antenna coil 515 may be selected to generate different voltage levels in the RFID-IC 505 and in the capacitors 555 and 565. For example, the RFID-IC 505 may use taps 1 and 2 to receive a certain AC voltage across the multiple tap antenna coil 515 to obtain a required voltage across capacitor 545 in parallel with the RFID-IC 505 for proper operation. The harvesting circuitry may use taps 3 and 4 to garner a larger segment of antenna to produce higher voltages in capacitors 555 and 565. Thus the multiple tap antenna coil 515 is able to deliver different voltages for the RFID-IC and for power harvesting to separate the RFID-IC 505 from the rest of the power harvesting apparatus 500. By delivering different voltages in this manner, the RFID-IC 505 is spared the larger voltages and currents used by the load(s) 580, and multiple circuits with different power requirements may be implemented in the power harvesting apparatus 500.

To manage different voltages used by the RFID-IC 505 at pin 510 relative to ground, and pin 520 relative to ground, the multiple taps of the multiple tap antenna coil 515 may not be symmetrical in relation to the center tap 0, and may be offset by a predetermined voltage as discussed herein. This non-symmetrical behavior is compensable by shifting the taps 1 and 2 to 1a and 2a as illustrated in FIG. 5A.

Asymmetry is then compensated by another asymmetry, or a "shift" could be to compensated by an offset which was caused from an asymmetry. As illustrated in FIG. 5A, both series capacitors 555 and 565 are used.

The RFID-IC 505 may have node 530 (as described above in reference to FIG. 3) to connect to a data bus or the like, which may connect to a node 518 of load(s) 580.

The power harvesting apparatus 500 including an RFID-IC illustrated in FIG. 5A may include a two half-wave voltage doubling rectification circuit 570 including half-wave rectifier pairs 571 and 572. For this kind of rectification, the multiple tap antenna coil 515 may be extended to tap 3 and tap 4 and the center tap 0 may be connected to ground. In this configuration, a reduction of series-capacitors to one instead of two is possible. A strong "cross current" may arise, and outputs 535 and 530 may be interrupted because of strong asymmetry. Thus, in embodiments described herein, asymmetry may be used when no data is exchanged.

Figure 5B:
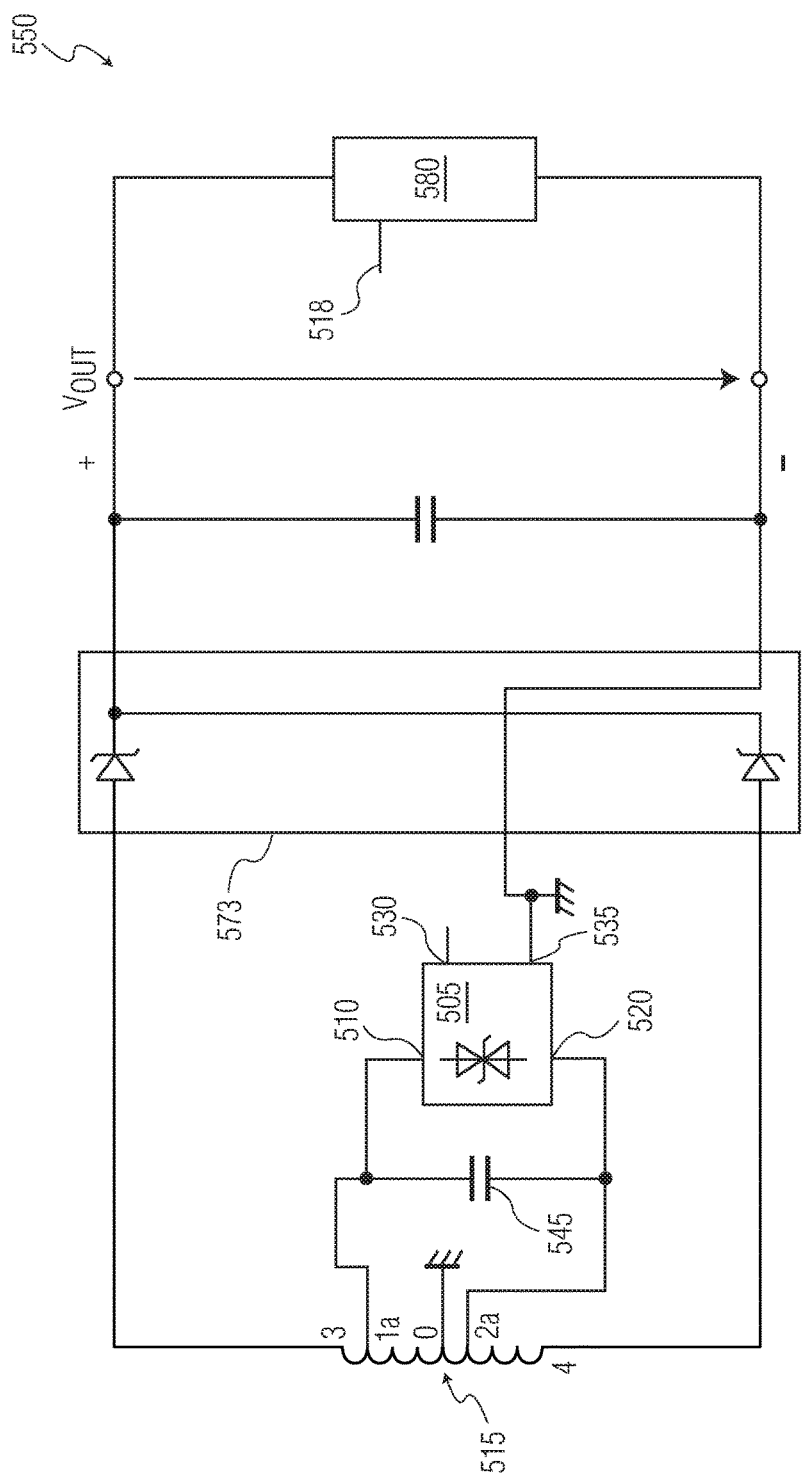
FIG. 5B illustrates another power harvesting apparatus including an RFID-IC, a multiple taps antenna coil, a double half wave rectification circuit, in accordance with embodiments described herein.

FIG. 5B illustrates another power harvesting apparatus 525 including an RFID-IC 505, a multiple tap antenna coil 515, and a double half wave rectification circuit 573 in accordance with embodiments described herein. The power harvesting apparatus 525 may be implemented without a capacitive RF-voltage divider and without symmetrical series capacitors.

As illustrated in FIG. 5B, without the use of series capacitors, the multiple taps antenna may operate without the coil tap 4, resulting in a reduction in antenna coil size. A smaller number of diodes may be used for one wave rectification, reducing current and power by half.

Figure 5C:
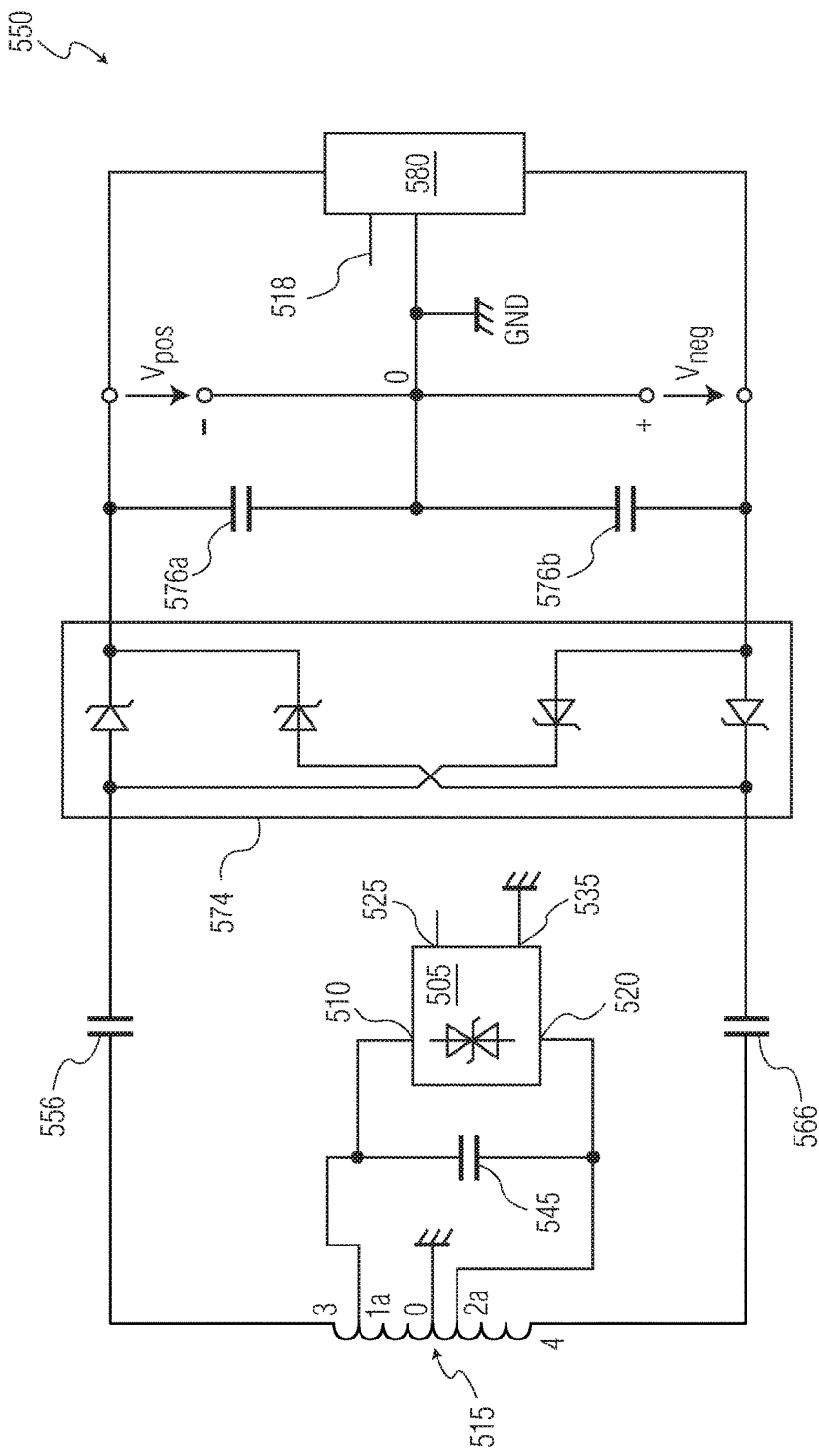
FIG. 5C illustrates another power harvesting apparatus including an RFID-IC, a multiple tap antenna coil, symmetrical series-capacitors, bridge rectification, dual output-voltages in accordance with embodiments described herein.

FIG. 5C illustrates another power harvesting apparatus 550 including an RFID-IC 505, a multiple tap antenna coil 515, symmetrical series-capacitors 556 and 566, bridge rectification 574, and dual (positive/negative) output-voltages in accordance with embodiments described herein. The power harvesting apparatus 550 may be implemented without a capacitive RF-voltage divider.

FIG. 5C illustrates a power harvesting apparatus having an antenna-coil and bridge-rectification for positive and negative output voltages in accordance with embodiments described herein. FIG. 5C illustrates an output scheme for a power harvesting apparatus 550 that differs from power harvesting apparatus 500 in that $V_{OUT}$ may be taken as dual output voltages $V_{POS}$ and $V_{NEG}$ across capacitors 576a and 576b.

In accordance with embodiments described herein, using different rectification circuitry may change the series capacitance values and voltage handling capabilities of the power harvesting apparatuses. The various embodiments described herein could be used for different applications such as higher or lower voltage, higher or lower output current, higher or lower power, less read-sensitivity versus the opposite, and so on.

Regarding power harvesting apparatus 550 illustrated in FIG. 5C, series capacitors 556 and 566 may be omitted. This arrangement would cause a reduction in power harvesting and less of a read range.

In a multi-tap arrangement of multiple tap antenna coil 515, a center-tap 0 of the multiple tap antenna coil 515 may be connected to ground. Using the multiple tap antenna coil 515, voltage divider capacitors are not used.

In accordance with embodiments described herein, the capacitor that is parallel to the RFID-IC is the frequency adjustment/fine tuning component. As illustrated in FIG. 5C, having a positive output voltage and a negative voltage may be useful for special operational amplifiers and other circuits. When a positive and negative output are used, two capacitors 576a and 576b may be used.

Figure 5D:
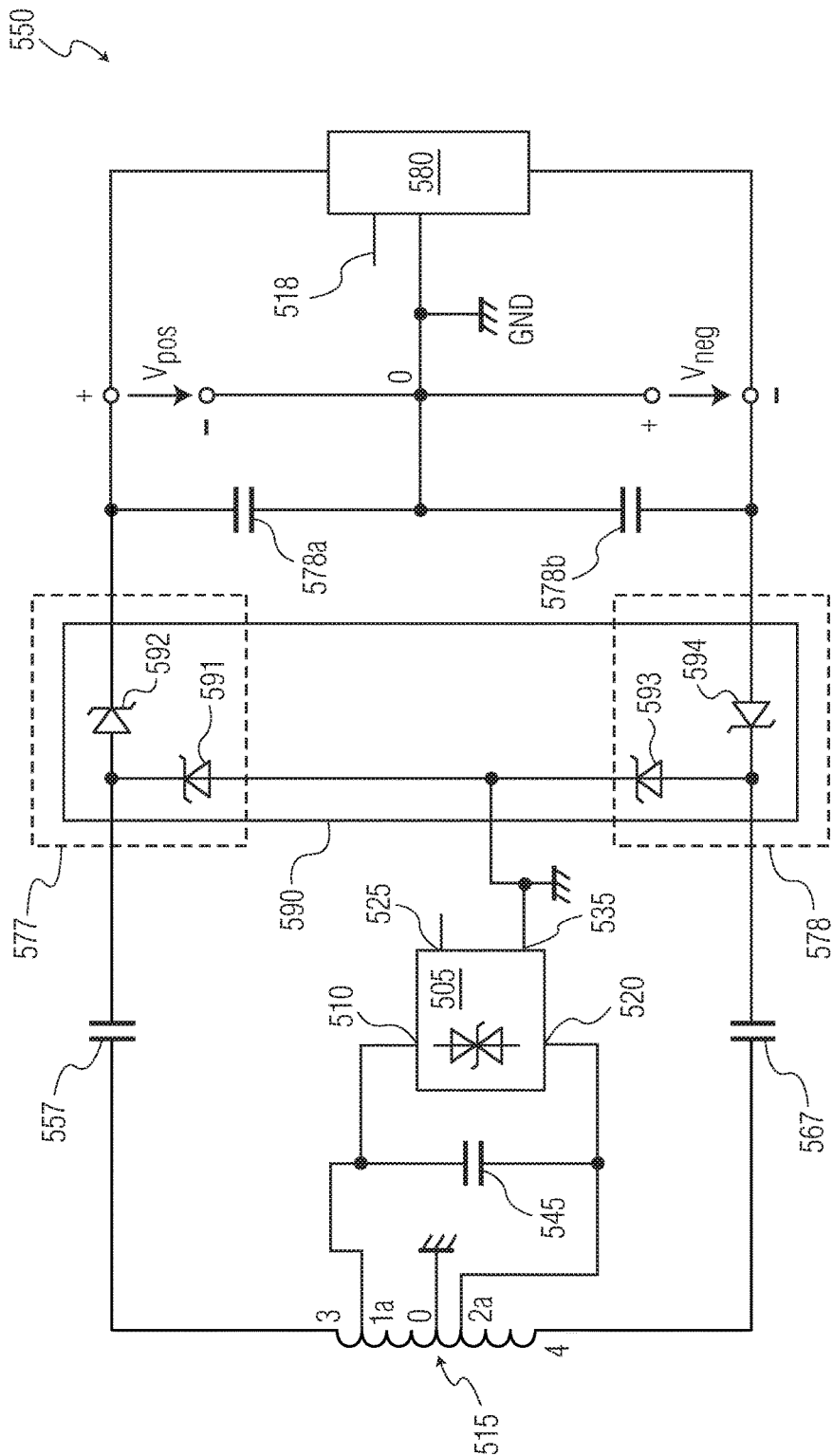
FIG. 5D illustrates another power harvesting apparatus including an RFID-IC, a multiple tap antenna coil, symmetrical series-capacitors, two half wave voltage doubling circuits in series, and dual output-voltages in accordance with embodiments described herein.

FIG. 5D illustrates another power harvesting apparatus 575 including an RFID-IC 505, a multiple tap antenna coil 515, symmetrical series-capacitors 557 and 567, two half wave voltage doubling circuits 577 and 578 in series, and dual (positive/negative) output-voltages in accordance with embodiments described herein. The power harvesting apparatus 575 may be implemented without a capacitive RF-voltage divider.

As illustrated in FIG. 5D, instead of a bridge rectifier as illustrated in FIG. 5C, for example, a positive half-wave voltage doubling circuit 577 having diodes 591 and 592 such as Zener diodes or others as described herein, and a negative half-wave voltage doubling circuit 578 having diodes 593 and 594 such as Zener diodes or others as described herein for voltage limitation in rectification circuitries. The overall rectification circuit may be denoted 590. To produce a dual voltage output as illustrated, series capacitors 557 and 567 are used. In comparison to other embodiments such as the one illustrated in FIG. 5A, the power harvesting apparatus 575 may produce a higher voltage, less current, and little impact to the read-range of the apparatus.

Figure 6A:
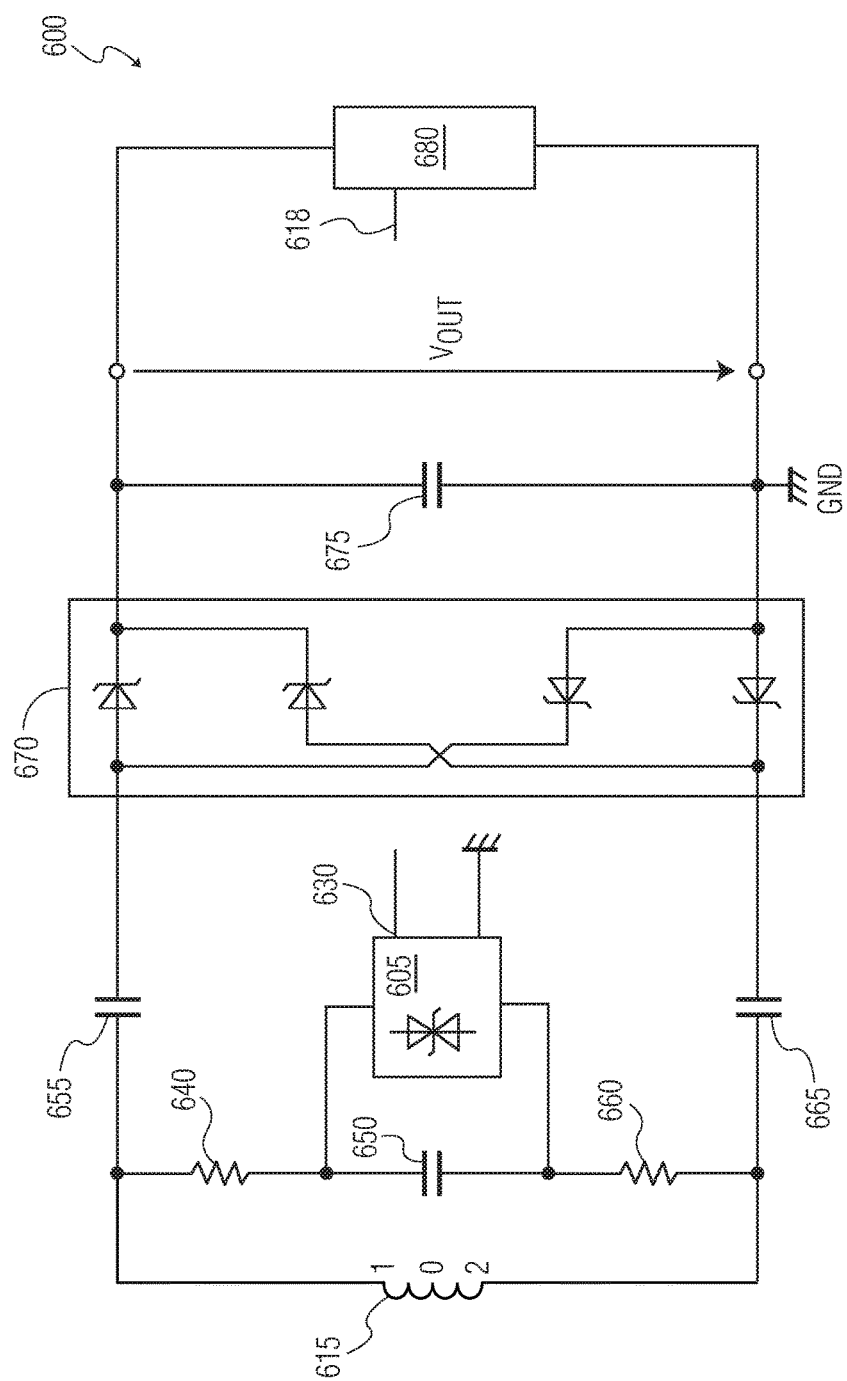
FIGS. 6A, 6B and 6C illustrate respective power harvesting apparatuses including an RFID-IC in accordance with embodiments described herein.
Figure 6B:
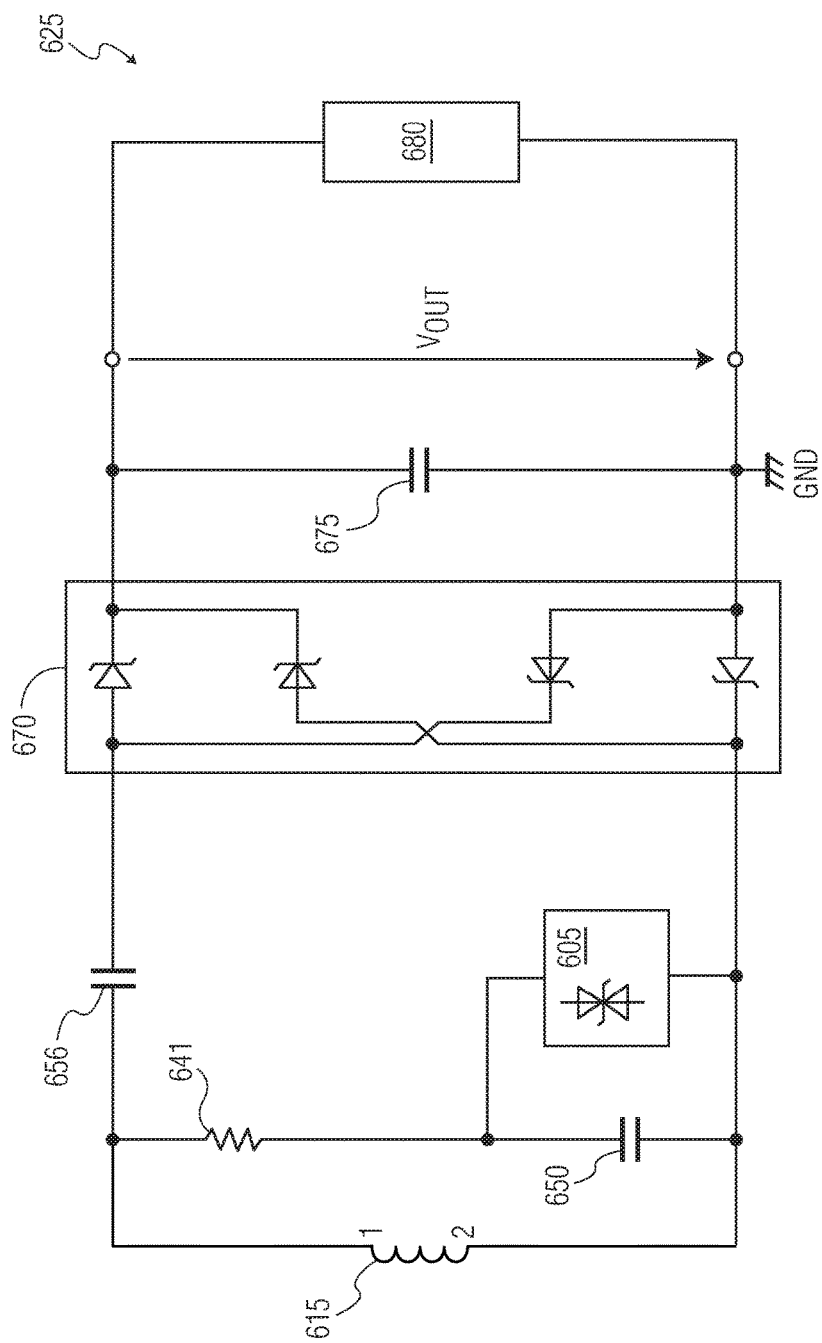

FIGS. 6A and 6B illustrate respective power harvesting apparatuses 600 and 625 including an RFID-ICs in accordance with embodiments described herein. FIG. 6A may use FIG. 3 as a basis, replacing capacitors 340 and 360 with resistors 640 and 660. FIG. 6B may use FIG. 4A as a basis, replacing capacitor 440 with resistor 641.

Figure 6C:
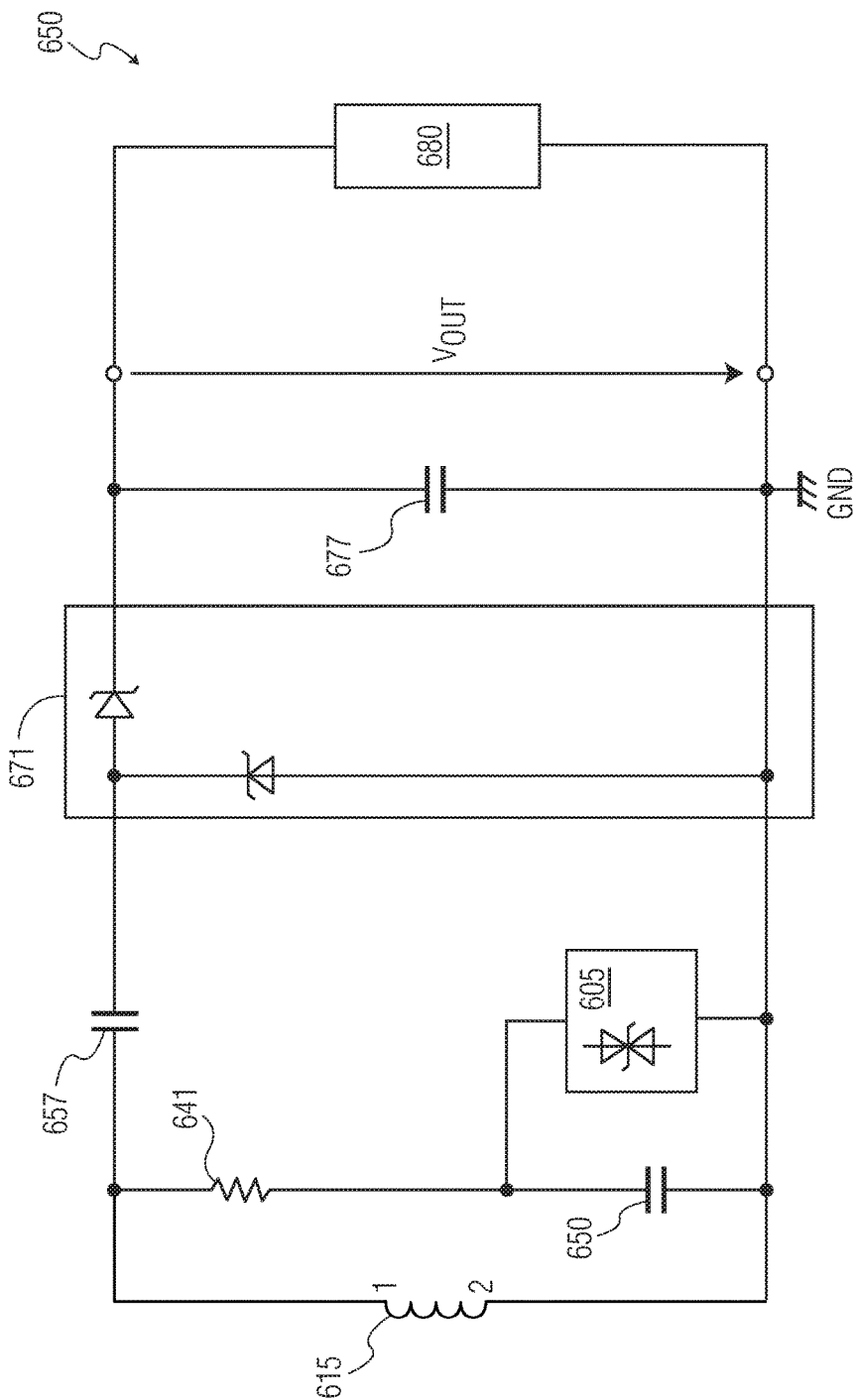

FIGS. 6A, 6B and 6C illustrate respective power harvesting apparatuses 600, 625, and 650 including an RFID-IC 605 in accordance with embodiments described herein. As illustrated, the capacitive voltage divider could be replaced with a resistive voltage divider using resistors 640 and 660, for example in FIG. 6A. In FIG. 6A, for power harvesting apparatus 600, when connecting a signal from node 630 of the RFID-IC 605 to a node 618 of a load(s), symmetrical capacitors 655 and 665 may be used. Rectifier 670 may convert AC voltage and current to DC to voltage and current to be used by load(s) 680.

In another power harvesting apparatus 650 illustrated in FIG. 6B, when RFID-IC 605 does not communicate with the load(s) 680, a single capacitor 656 may be used in an asymmetrical configuration. The value of capacitor 656 of FIG. 6B may be half of the combined capacitor values of 655 and 665 of FIG. 6A, when the value of capacitor 655 equals the value of capacitor 665.

FIG. 6C illustrates another power harvesting apparatus 650 including an RFID-IC 605 in accordance with embodiments described herein. FIG. 6C may be based on FIG. 4B, where the capacitor 440 of the RF-voltage divider is replaced by the resistor 641. In FIGS. 4B and 6C, bridge rectification circuits may be replaced by one half-wave voltage doubling circuit.

As illustrated in FIG. 6C, when RFID-IC 605 does not communicate with the load(s) 680, the bridge rectification is replaced by one half-wave voltage doubling circuit, and a single capacitor 657 with a slight change in capacitance from capacitor 656 may be used in an asymmetrical configuration. For the embodiments of FIG. 6B and FIG. 6C, respective series capacitors 656 and 657 may be omitted, but with a drop in RFID-performance.

Although the various embodiments have been described in detail with particular reference to certain aspects thereof, it should be understood that the embodiments described herein are capable of other embodiments and its details are capable of modifications in various obvious respects. As is readily apparent to those skilled in the art, variations and modifications can be effected while remaining within the spirit and scope of the embodiments described herein. Accordingly, the foregoing disclosure, description, and figures are for illustrative purposes only and do not in any way limit the embodiments described herein, which is defined only by the claims.

The invention claimed is:

1. A circuit apparatus, comprising:
an input section configured to receive an electromagnetic (EM) transmission;
a voltage divider section configured to divide the EM transmission into a plurality of voltage levels and deliver the of voltage levels to a plurality of circuits;
radio frequency identification integrated circuit (RFID-IC) configured to receive one of the plurality of voltage levels;
a rectifier portion configured to receive another of the plurality of voltage levels and configured to rectify AC power received in the EM transmission; and
a load configured to receive DC power from the rectifier portion,
wherein one voltage level of the voltage divider section is configured to supply power to the RFID-IC.

2. The circuit apparatus of claim 1, wherein the RFID-IC includes a data port configured to communicate with electrical components on the circuit apparatus.

3. The circuit apparatus of claim 1, wherein the RFID-IC is in parallel with a capacitor of the voltage divider portion.

4. The circuit apparatus of claim 1, comprising at least one capacitor configured to store charge to be rectified.

5. The circuit apparatus of claim 4, wherein the at least one capacitor is arranged asymmetrically.

6. The circuit apparatus of claim 1, wherein the input section comprises an antenna with multiple taps.

7. The circuit apparatus of claim 1, wherein the voltage divider includes a plurality of capacitors.

8. The circuit apparatus of claim 1, wherein the voltage divider includes a plurality of resistors.

9. A power harvesting apparatus, comprising:
an antenna configured to receive an electromagnetic (EM) transmission, the antenna including a plurality of taps configured to deliver different voltages at a same time received from the EM transmission;
at least one capacitor of a radio frequency identification integrated circuit configured to store charge from one of the different voltages received in the EM transmission; and
a rectifier portion configured to rectify power received from another of the plurality of voltages in the EM transmission and provide the rectified power to a load.

10. The power harvesting apparatus of claim 9, wherein the at least one capacitor is arranged asymmetrically.

11. The power harvesting apparatus of claim 10, comprising a plurality of capacitors that are arranged symmetrically.

12. The power harvesting apparatus of claim 10, wherein the rectifier portion is configured to produce two voltages across an output load.

13. The power harvesting apparatus of claim 12, wherein the two voltages are a positive voltage and a negative voltage.

14. A power harvesting circuit, comprising: an antenna configured to receive an electromagnetic (EM) transmission; a voltage divider circuit having a plurality of nodes configured to produce a plurality of voltages across different sets of the plurality of nodes; a low power circuit configured to receive one of the plurality of voltage levels from the EM transmission; a high power circuit configured to receive another of the plurality of the voltage levels an power a load using the high voltage; and a rectification circuit configured to receive the another voltage level from the EM transmission and rectify the another voltage level to a DC voltage.

15. The power harvesting circuit of claim 14, wherein the low power circuit is a radio-frequency identification integrated circuit (RFID-IC).

16. The power harvesting circuit of claim 14, comprising a load delivery circuit configured to deliver a stepped down voltage to a load.

17. The power harvesting circuit of claim 14, wherein the voltage divider circuit includes a plurality of capacitors.

18. The power harvesting circuit of claim 14, wherein the low power circuit is an RFID integrated circuit.

19. The power harvesting circuit of claim 14, comprising a galvanic connection between the low power circuit and the high power circuit.

20. The power harvesting circuit of claim 14, wherein the voltage divider circuit includes an antenna having a center tap.

* * * * *